Patented Dec. 18, 1945

2,391,368

UNITED STATES PATENT OFFICE 2,391,368

RESIN COMPOSITION

George J. Underwood, Chicago, Ill., assignor to Hercules Powder Company, Wilmington, Del., a corporation of Delaware No Drawing. Application March 30, 1943, Serial No. 481,134

11 Claims. (Cl. 260—7)

This invention relates to a composition of matter for impregnating glass wool, asbestos fiber, and the like, and to an insulating material comprising impregnated glass wool, asbestos fiber, and the like.

Insulating materials have in the past been formed from materials, such as glass wool and asbestos fiber, which were impregnated with a phenolic resinous composition. This practice was subject to the disadvantages that the impregnating composition used was usually a solution of a phenolic resin in a solvent, which made it comparatively expensive, and the material was not highly water resistant, which is important in many impregnated materials, and particularly impregnated paper and paper pulp.

Now in accordance with the present invention, an inexpensive highly water resistant composition may be formed from a phenolic resin, and an extracted pine wood pitch characterized by substantial insolubility in petroleum hydrocarbons which are made up in the form of a water emulsion. The product is in the form of a homogeneous varnish, which is used to impregnate glass wool, asbestos fiber, paper, and the like.

The invention is carried out by mixing a water-soluble or water-dispersible phenolic resin in water or an aqueous ammonia solution, and adding this to an aqueous dispersion of an extracted pine wood pitch characterized by substantial insolubility in petroleum hydrocarbons. If an ammonia solution is used for dispersing the phenolic resin, the extracted pine wood pitch may be added directly but, if the phenolic resin has been dissolved in water, the extracted pine wood pitch should be added in the form of an emulsion or paste formed by mixing the pitch with a solution of ammonium hydroxide. The amount of ammonium hydroxide may be such as to partially or completely neutralize the extracted pine wood pitch and a protective colloid, such as caseinate, may be added to form an emulsion of fine particle size.

The impregnating varnish formed in this invention may be used for a variety of purposes but is particularly useful in forming insulating material with rock wool, asbestos fiber, paper, and the like. It is used as a spray or otherwise to impregnate the material which is then dried to evaporate off the water and then subjected to heat with or without pressure to form the insulating material.

The following are examples of methods for carrying out the invention:

Example 1

A solution containing 0.5 part of casein, 1 part of commercial ammonium hydroxide (28%), and 2 parts of water was mixed for about 30 minutes in a steam heated mixer with 10 parts of extracted pine wood pitch characterized by substantial insolubility in petroleum hydrocarbons. To the paste thus formed was added a mixture of 10 parts of phenol-aldehyde condensate water-soluble resin and 10 parts of 28% ammonia. The resulting varnish was made up to 10% solids content by the addition of water. The varnish was sprayed on glass wool, which was dried at about 110° C. for about 5 hours to form a water-impervious insulating composition.

Example 2

5 parts of extracted pine wood pitch characterized by substantial insolubility in petroleum hydrocarbons were melted with 5 parts of a colored resin by-product obtained in the refining of FF wood rosin. This melt was added to a solution containing 0.5 part of casein, 1 part of commercial ammonium hydroxide (28%), and 2 parts of water. The mixture was agitated for about ½ hour in a steam heated mixer. The paste thus formed was added to a mixture of 10 parts of phenol-aldehyde condensate water-soluble resin, and 10 parts of 28% ammonia. The varnish emulsion thus formed was used to impregnate asbestos fiber which was then heated to form an insulating composition.

Example 3

500 parts of 88% phenol, 150 parts of extracted pine wood pitch, 170 parts of trioxymethylene, and 12.5 parts of 40% potassium hydroxide solution were mixed and reacted for 1 hour under reflux.

A solution containing 50 parts of casein, 100 parts of 28% ammonium hydroxide, and 200 parts of water was heated in a steam heated mixer with 1000 parts of extracted pine wood pitch. After mixing for about 30 minutes, equal proportions of the above phenol composition were added, mixed, and the whole diluted with water to a 20% solids composition. This composition was used to impregnate glass wool, which was heated and formed into an insulating bat.

Example 4

5 parts of paraformaldehyde were gradually added to 100 parts of extracted pine wood pitch in a molten condition (about 200° C.). To this were added 90 parts of a phenol-aldehyde water-soluble resin.

An emulsion was made of 50 parts of casein, 100 parts of 28% ammonium hydroxide, 200 parts of water, and 1000 parts of pulverized extracted pine wood pitch by mixing in a steam heated mixer for about 30 minutes. To this emulsion was then added the above mixture and the whole diluted with 1100 parts of water with continued agitation. The product was used to impregnate paper, which was heated and pressed to form an insulating board.

The ratio of the phenolic varnish to the extracted pine wood pitch emulsion may vary considerably, but an amount from about 20% to about 80% by weight of phenolic resin of the total solids, and preferably about 50%, gives the best results. Water may be added to dilute the composition to obtain a desired concentration of solids. For example, in the preparation of rock wool insulation, a solids content of from 10 to 20% gives the best results. For other purposes, such as the impregnation of paper pulp, amounts up to about 55% more solids may be used.

The phenol-aldehyde condensate water-soluble resin may be prepared from phenol or phenolic materials, such as cresol, xylenol, 2,2-bishydroxyphenyl propane, etc., and may be condensed with various carbonyl compounds, such as formaldehyde, acetaldehyde, furfural, etc. The condensation is allowed to take place only to the extent of forming the water-soluble product and is not allowed to proceed to a water-insoluble stage.

The extracted pine wood pitch referred to in this specification comprises a residue low in abietic acid remaining after the separation of refined rosin high in abietic acid from resinous material obtained by extraction of pine wood with a solvent capable of extracting a petroleum hydrocarbon-insoluble resin component. It is characterized by substantial insolubility in cold petroleum hydrocarbons and will differ somewhat in its specific characteristics, such as acid number, melting point, exact petroleum ether solubility, content of naphtha and toluol soluble matter, depending upon the method of recovery of rosin from pine wood used in its production.

The pine wood pitch referred to above is a resinous material which will be hereinafter designated by the term "substantially petroleum hydrocarbon-insoluble pine wood resin." This resinous material may be prepared from pine wood, preferably from stump pine wood, and comprises the resinous residue remaining after separation of the rosin from the total resinous extract of the wood. Thus, the pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum hydrocarbon-insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantialily insoluble in petroleum hydrocarbons. Alternatively, the residue of the initial coal tar hydrocarbon extract may be treated with a mixture of a petroleum hydrocarbon, as gasoline, and furfural and the two layers which form separated, in which case the petroleum hydrocarbon-insoluble pine wood resin is found dissolved in the furfural from which it may be obtained by evaporation of the furfural. Other methods of isolating the desired petroleum hydrocarbon-insoluble pine wood resin may be employed, if desired, such as with use of other solvents for extracting the total resin content from the wood. The resin may be defoamed by steaming or heat-treated to remove volatile substances.

This resinous material is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet, or nearly meet, the following specifications; namely, substantial insolubility in petroleum hydrocarbons, substantially complete solubility in alcohol, a methoxy content of from about 3% to about 7% (usually from about 4% to about 6%), an acid number in the range from about 80 to about 110, a drop melting point from about 95° C. to about 125° C., and a non-carboxylic hydroxyl content of about 5 to about 9%.

As indicated in the examples, the phenolic component may be a phenol-aldehyde condensate resin per se or it may be a mixed condensate of the phenol-aldehyde and extracted pine wood pitch.

The extracted pine wood pitch emulsion may be the pine wood pitch itself in an ammonia solution with a colloiding agent, such as casein, or it may be the modified product of the extracted pine wood pitch condensed with an aldehyde.

The impregnating composition of this invention is used for the impregnation of fibers in the production of insulating materials, packings, etc. It is used to impregnate glass wool, asbestos fiber, rock wool, paper, paper pulp, etc. After impregnating, the material is subjected to heat for a period of time sufficient to drive off the water and to set the resin.

Thus, the present invention has described a new and improved impregnating composition and product which have the particular advantages that they are inexpensive, strong and water impervious.

This application is a continuation-in-part of my copending application, Serial No. 450,093, filed July 7, 1942.

What I claim and desire to protect by Letters Patent is:

1. An impregnating composition comprising an aqueous phenol-aldehyde resin solution and an aqueous emulsion of a residue low in abietic acid remaining after the separation of refined rosin high in abietic acid from resinous material obtained by extraction of pine wood with a solvent capable of extracting a petroleum hydrocarbon-insoluble resin component.

2. An impregnating composition comprising an aqueous ammonical phenol-aldehyde resin solution and an aqueous ammonical emulsion of a residue low in abietic acid remaining after the separation of refined rosin high in abietic acid from resinous material obtained by extraction of pine wood with a solvent capable of extracting a petroleum hydrocarbon-insoluble resin component, said phenol-aldehyde resin comprising from about 20% to about 80% of the total solids content.

3. An impregnating composition comprising an aqueous phenol-aldehyde resin solution and an aqueous emulsion of a residue low in abietic acid remaining after the separation of refined rosin high in abietic acid from resinous material obtained by extraction of pine wood with a solvent capable of extracting a petroleum hydrocarbon-insoluble resin component, said phenol-aldehyde resin comprising about 50% and said residue comprising about 50% each of the total solids.

4. An impregnating composition comprising an aqueous solution of a phenol-aldehyde resin and an aqueous emulsion of a modified residue low in abietic acid remaining after the separation of refined rosin high in abietic acid from resinous material obtained by extraction of pine wood with a solvent capable of extracting a petroleum hydrocarbon-insoluble resin component, said residue modified by being condensed with an aldehyde.

5. An impregnating composition comprising an aqueous phenol-formaldehyde condensate resin solution and an aqueous emulsion of a residue low in abietic acid remaining after the separation of refined rosin high in abietic acid from resinous material obtained by extraction of pine wood with a solvent capable of extracting a petroleum hydrocarbon-insoluble resin component.

6. An impregnating composition comprising an aqueous solution of a condensate of phenol, aldehyde, and a residue low in abietic acid remaining after the separation of refined rosin high in abietic acid from resinous material obtained by extraction of pine wood with a solvent capable of extracting a petroleum hydrocarbon-insoluble resin component and an aqueous emulsion of said residue.

7. An impregnating composition comprising a water-soluble phenol-aldehyde condensate resin, a residue low in abietic acid remaining after the separation of refined rosin high in abietic acid from resinous material obtained by extraction of pine wood with a solvent capable of extracting a petroleum hydrocarbon-insoluble resin component, an emulsifying agent, and an alkali solution.

8. A process for the production of an insulating material comprising impregnating insulating fibers with a composition comprising an aqueous phenol-aldehyde resin solution and an aqueous emulsion of a residue low in abietic acid remaining after the separation of refined rosin high in abietic acid from resinous material obtained by extraction of pine wood with a solvent capable of extracting a petroleum hydrocarbon-insoluble resin component and heating to drive off the water and set the resin.

9. An impregnating composition comprising an aqueous phenol-aldehyde resin solution and an aqueous emulsion of a material selected from the group consisting of a residue low in abietic acid remaining after the separation of refined rosin high in abietic acid from resinous material obtained by extraction of pine wood with a solvent capable of extracting a petroleum hydrocarbon-insoluble resin component and said residue which has been modified by being condensed with an aldehyde.

10. An impregnating composition comprising a water-soluble phenol-aldehyde resin and an aqueous emulsion of a residue low in abietic acid remaining after the separation of refined rosin high in abietic acid from resinous material obtained by extraction of pine wood with a solvent capable of extracting a petroleum hydrocarbon-insoluble resin component, containing casein and ammonium hydroxide.

11. An impregnating composition comprising a water-soluble phenol-aldehyde resin and an aqueous emulsion of a mixture of a residue low in abietic acid remaining after the separation of refined rosin high in abietic acid from resinous material obtained by extraction of pine wood with a solvent capable of extracting a petroleum hydrocarbon-insoluble resin component and a colored resin by-product obtained in the refining of FF wood rosin, said emulsion containing casein and ammonium hydroxide.

GEORGE J. UNDERWOOD.